United States Patent [19]
Fritz

[11] 3,797,891
[45] Mar. 19, 1974

[54] PNEUMATIC HOPPER DISCHARGE OUTLET

[75] Inventor: William E. Fritz, Hinsdale, Ill.

[73] Assignee: The Youngstown Steel Door Company, Cleveland, Ohio

[22] Filed: Aug. 28, 1972

[21] Appl. No.: 284,254

[52] U.S. Cl............. 302/52, 251/144, 251/304, 105/283, 222/554
[51] Int. Cl............................................ B65g 53/40
[58] Field of Search............... 105/283; 214/83.2; 222/486, 548, 554, 555; 251/144, 208, 304; 302/42, 49, 52

[56] References Cited
UNITED STATES PATENTS

| 3,498,507 | 3/1970 | Seaver | 222/554 X |
|---|---|---|---|
| 3,306,675 | 2/1967 | Fritz | 302/52 |
| 3,632,174 | 1/1972 | Miller | 302/52 X |
| 3,663,066 | 5/1972 | Fischer et al. | 302/52 X |
| 1,844,172 | 2/1932 | Moore | 302/49 |
| 2,744,666 | 5/1956 | Jacobs et al. | 222/554 X |
| 1,075,495 | 10/1913 | Reeder | 105/283 |
| 3,583,768 | 6/1971 | Koranda | 302/52 |
| 3,048,449 | 8/1962 | Aller | 302/52 |
| 3,105,721 | 10/1963 | Collins et al. | 302/52 |
| 3,402,971 | 9/1968 | Stevens | 302/52 |

FOREIGN PATENTS OR APPLICATIONS

| 67,812 | 5/1955 | France | 302/51 |

*Primary Examiner*—Evon C. Blunk
*Assistant Examiner*—W. Scott Carson
*Attorney, Agent, or Firm*—Robert R. Lockwood

[57] ABSTRACT

Between the lower longitudinal sharp edges of inclined hopper side walls is a pivotable valve shaft having cavities for alignment with the edges to control discharge of lading into an underlying trough which terminates in cylindrical outlet tubes for pneumatic removal of the lading. The cavities have various lengths and are positioned at different circumferential positions to achieve different unloading characteristics. The trough and the outlet tubes may have about the same cross sectional area.

4 Claims, 19 Drawing Figures

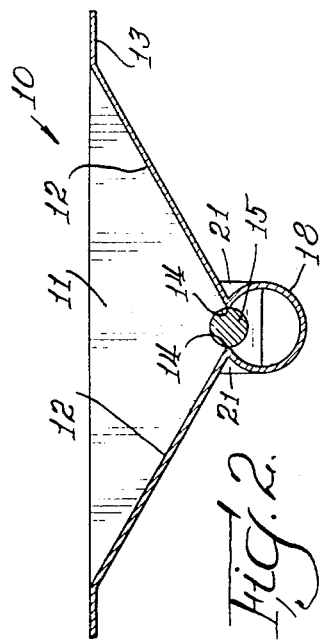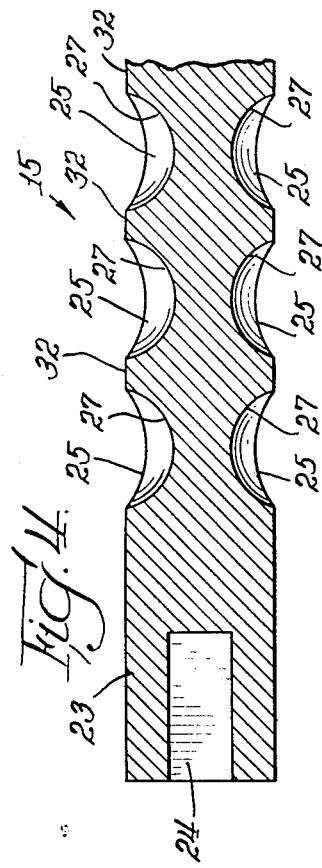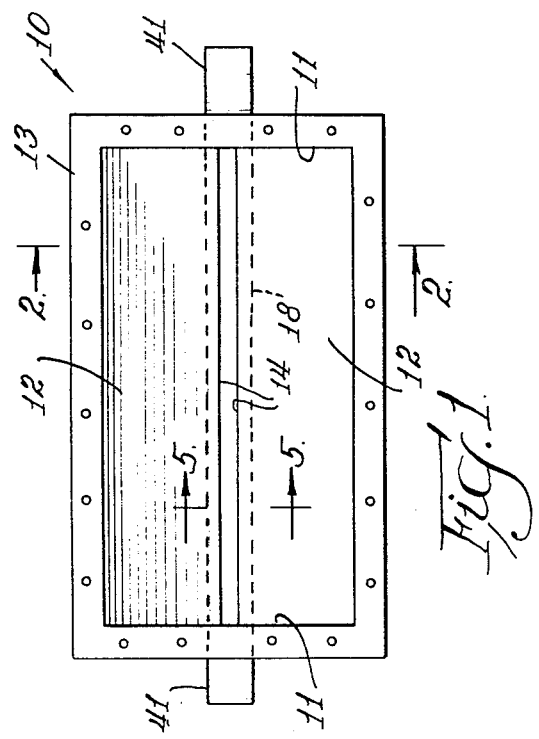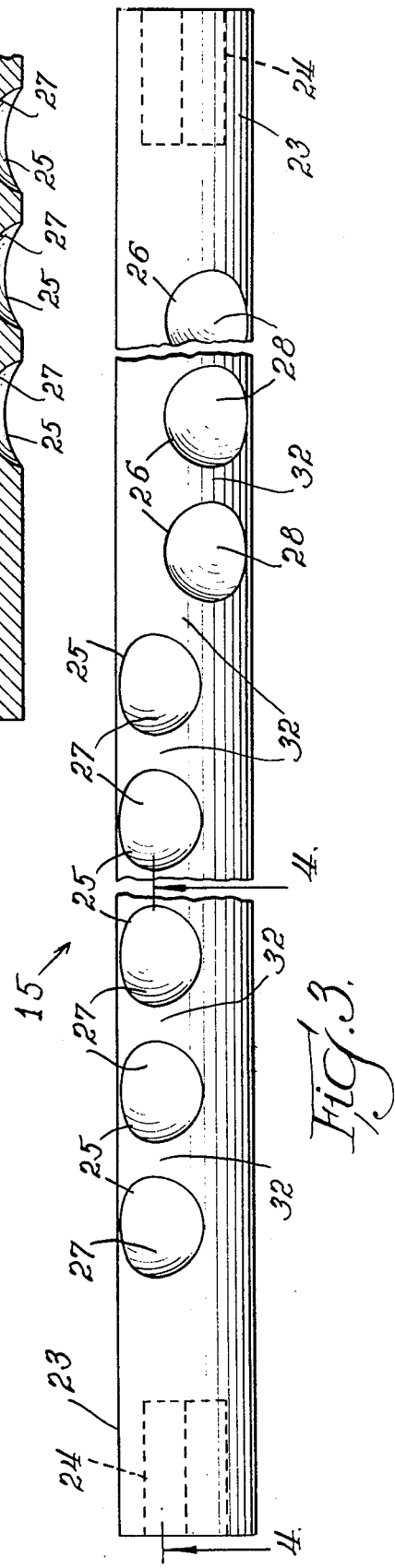

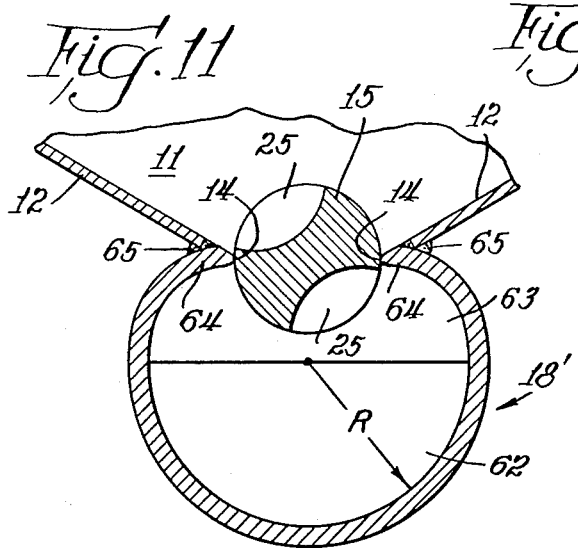
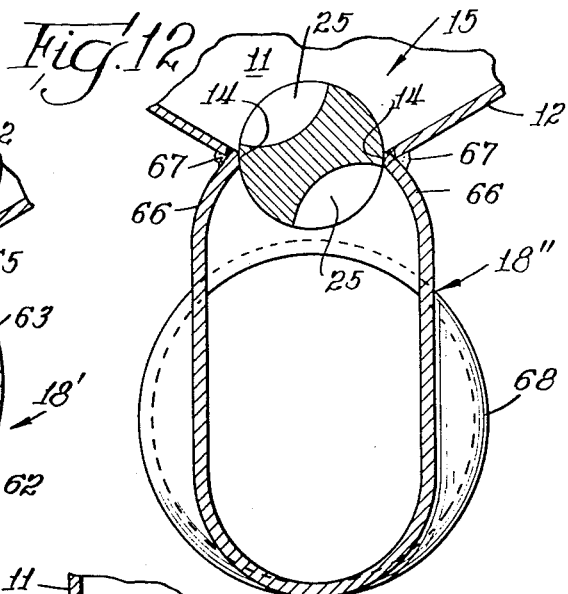
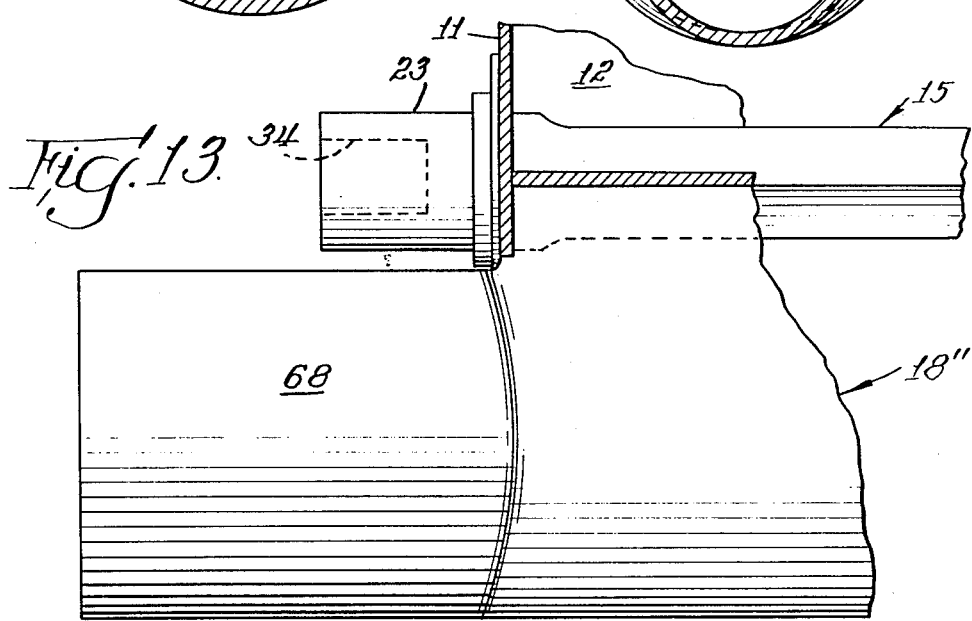
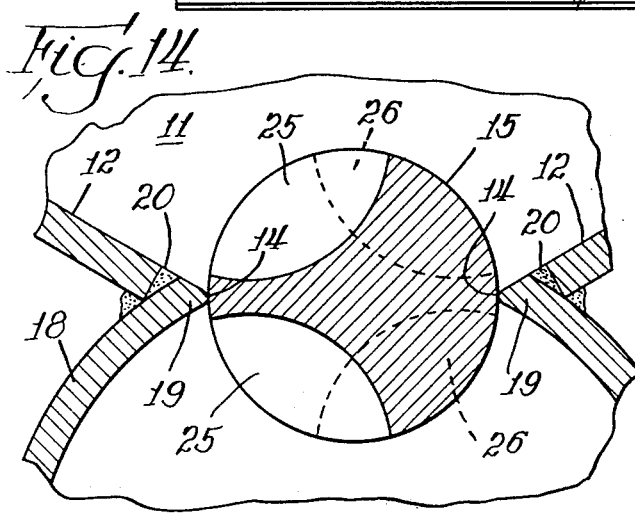
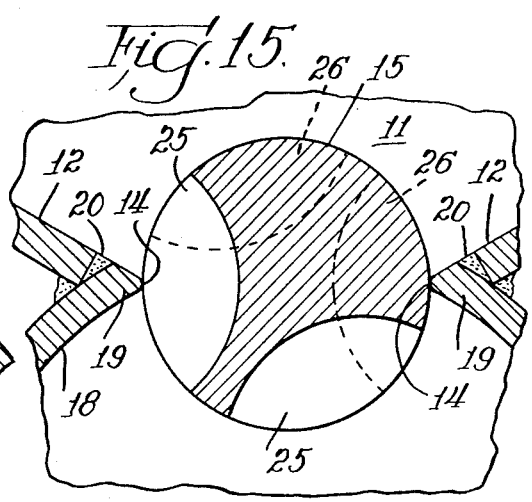

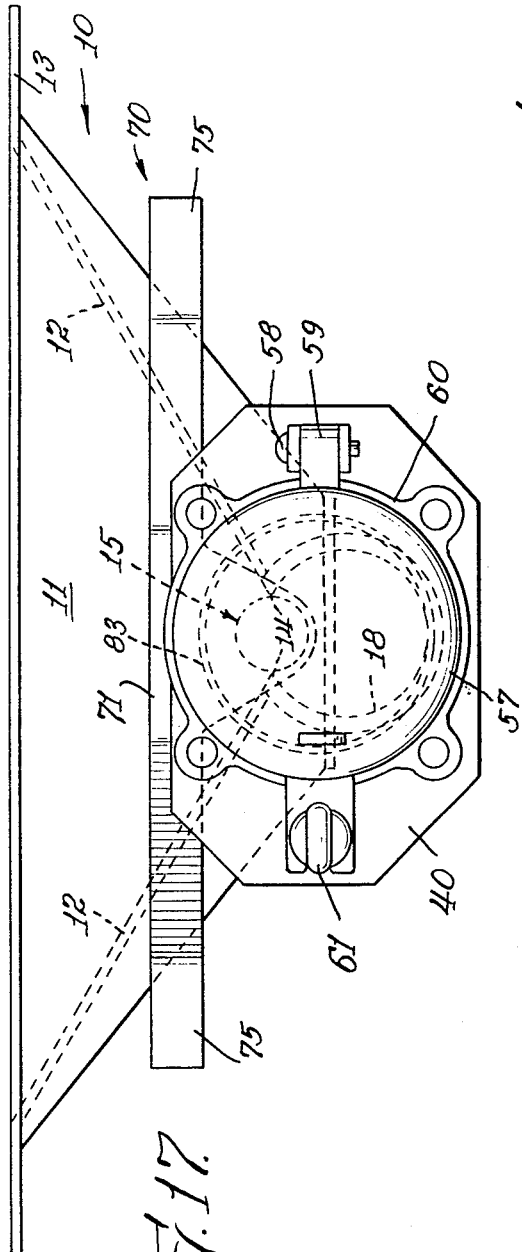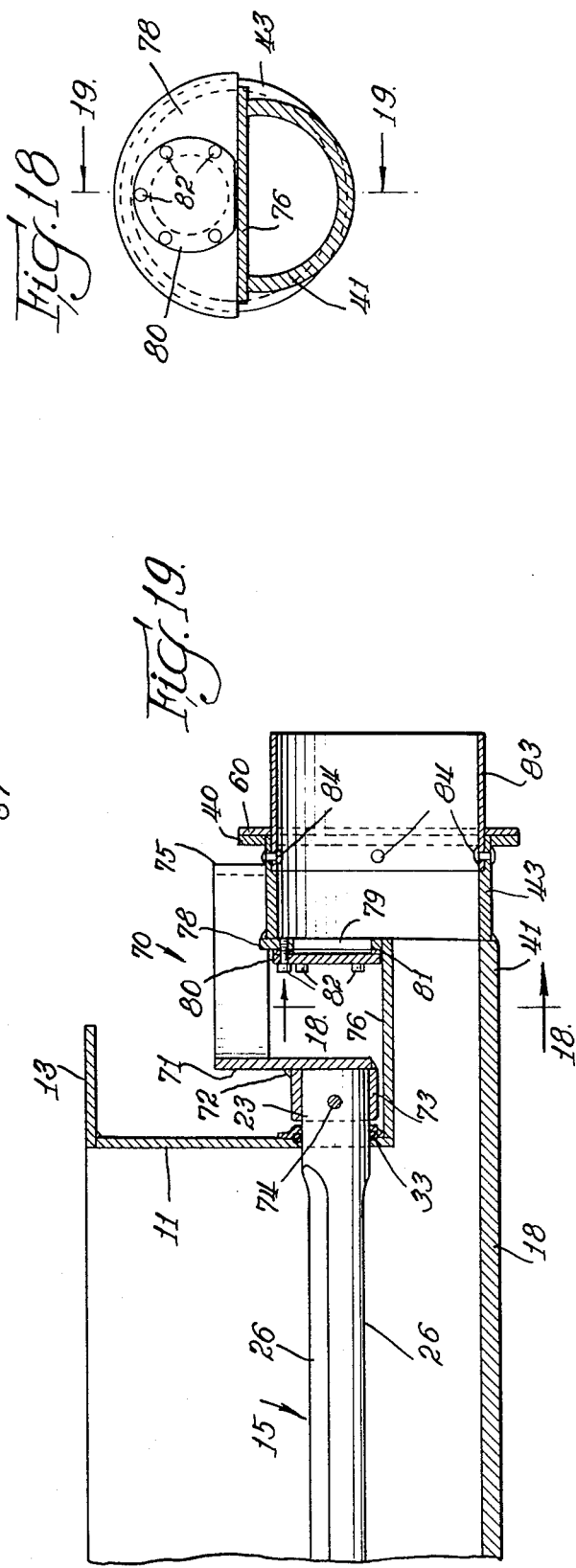

PNEUMATIC HOPPER DISCHARGE OUTLET

This invention relates, generally, to pneumatic hopper discharge outlets for railway hopper cars for transporting granular lading and it has particular relation to the regulation of the flow of lading during the discharge operation.

Among the objects of this invention are: To provide for controlling the flow of granular lading from a railway hopper car or the like in a new and improved manner; to minimize the amount of lading that is retained after completion of the application of vacuum to withdraw the lading; to provide for the pneumatic withdrawal of essentially all of the lading thereby avoiding the necessity of manual removal of any residue; to employ a valve shaft between the sharp longitudinal lower edges of the side walls of the hopper having pairs of cavities through which the lading can flow when the shaft is pivoted to open position; to employ cavities of various lengths and to locate them at different cylindrical positions around the shaft; to provide cylindrical sections between the cavities for bearing support intermediate its ends with the sharp edges of the side walls; to employ cavities at one end of the shaft spaced circumferentially from cavities at the other end whereby the valve shaft has two open positions on opposite sides of a closed position; to arrange for the flow of auxiliary air into cylindrical outlet tubes at the ends of a trough underlying the valve shaft through a filter that can be covered on removal of a handle employed for pivoting the valve shaft; and to arrange for the trough to have about the same cross sectional area as that of the outlet tubes; to locate cavities at opposite ends of the shaft in such relation that lading can be discharged at the same time from opposite sides of the shaft at the opposite ends; and to employ two pairs of elongated diametrically opposite cavities at different circumferential positions at opposite ends of the shaft.

In the drawings:

FIG. 1 is a top plan view of a pneumatic hopper discharge outlet embodying this invention.

FIG. 2 is a vertical sectional view taken generally along line 2—2 of FIG. 1.

FIG. 3 is a top plan view, at an enlarged scale, of the valve shaft that is employed in the construction shown in FIGS. 1 and 2.

FIG. 4 is a vertical sectional view taken generally along line 4—4 of FIG. 3.

FIG. 11 is a vertical sectional view showing a modified form of trough.

FIG. 12 is a vertical sectional view showing still another modification of the trough construction.

FIG. 13 is a view, in side elevation, and at a reduced scale of the trough and discharge tube shown in FIG. 12.

FIG. 14 is a view, similar to FIG. 6 showing the valve shaft in the closed position with the cavities of each pair being diametrically disposed at longitudinally spaced positions along the valve shaft.

FIG. 15 is a view, similar to FIG. 14 and shows the valve shaft in the open position permitting the lading to be discharged at opposite ends of the shaft and along opposite sides thereof.

FIG. 17 is a vertical elevational view taken generally along line 17—17 of FIG. 16.

FIG. 18 is a vertical sectional view taken generally along line 18—18 of FIG. 16 and of FIG. 19.

FIG. 19 is a vertical sectional view taken generally along line 19—19 of FIG. 18.

Figure 5:
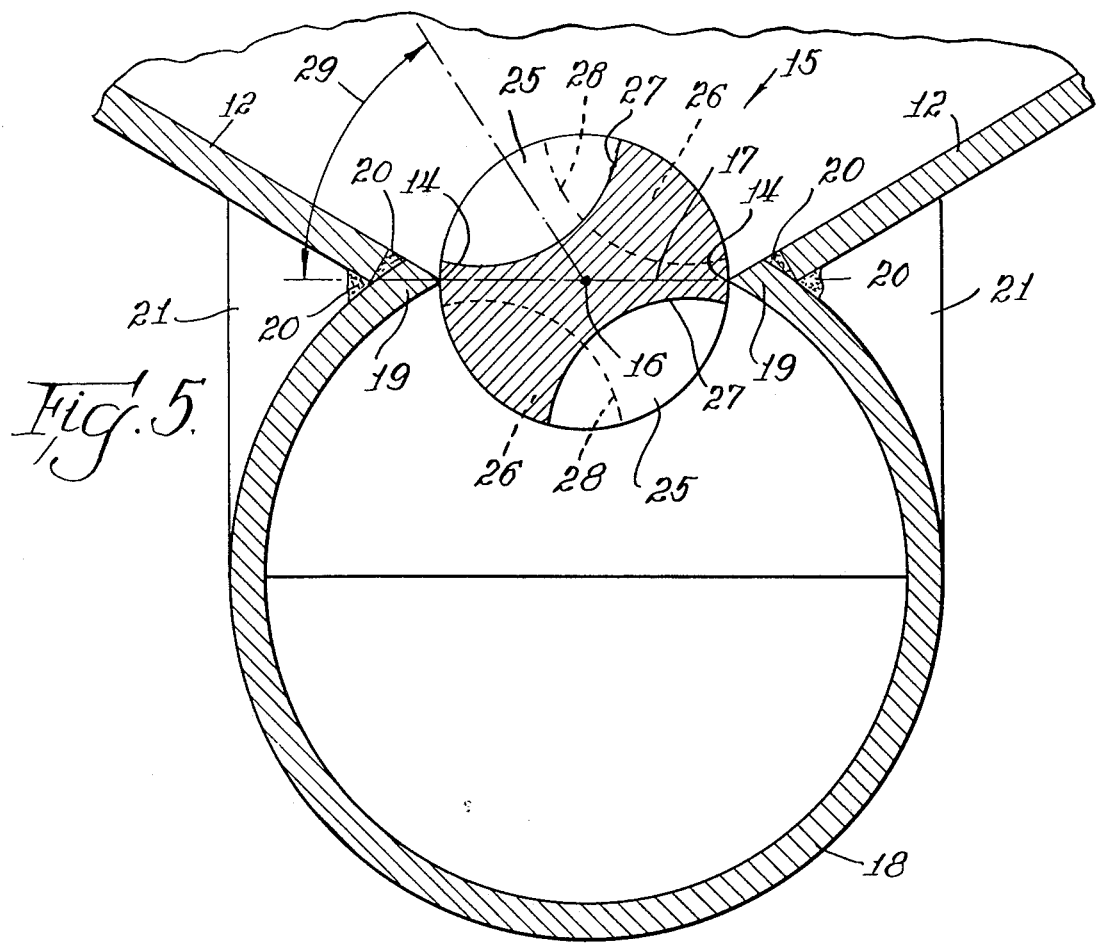
FIG. 5 is a vertical sectional view, at an enlarged scale, taken generally along line 5—5 of FIG. 1.

Referring now to FIGS. 1 and 2 of the drawings it will be observed that reference character 10 designates, generally, a hopper outlet for mounting on the underside of a hopper type railway car or the like. The hopper outlet 10 may be formed of aluminum, plastic or other similar material and, for illustrative purposes, it is pointed out that it may have an overall length of 70 inches and an overall width of 34½ inches. The hopper outlet 10 comprises vertical end walls 11 and inclined side walls 12 which are joined by a rectangular horizontal frame 13. The lower edges 14 of the inclined side walls 12 comprise sharp longitudinal edges for receiving therebetween a valve shaft 15 that may be formed of aluminum and may have a diameter of 2 inches. The space between the edges 14 is such as to permit only clearance between them and the cylindrical surface of the valve shaft 15 so that it is unlikely that granular lading in the hopper outlet 10 can escape between the edges 14 and the cylindrical surface of the valve shaft 15.

Figure 6:
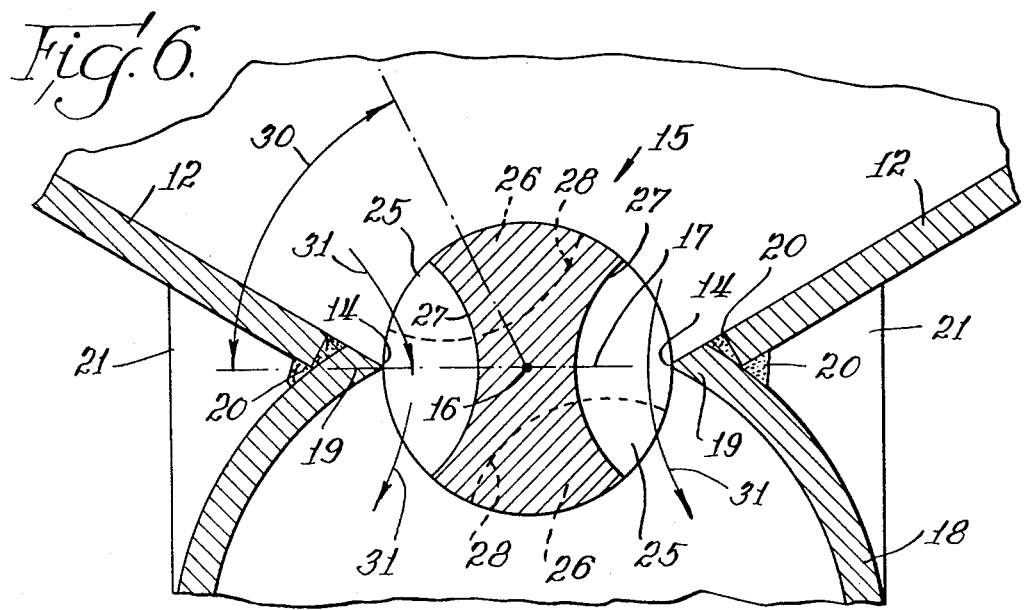
FIG. 6 is a view, similar to FIG. 5 but shows the valve in the full open position.

As shown in FIGS. 5 and 6 the valve shaft 15 is arranged to pivot about its longitudinal axis 16. The axis 16 is located along a line 17 between the edges 14 and midway thereof. The valve shaft 15 is located above a cylindrical trough 18 the upper ends 19 of which are welded, as indicated at 20, to the lower ends of the side walls 12. These ends 19 constitute extensions of the side walls 12 with the edges 14 actually being located on the upper ends 19. Plates 21, suitably secured to the side walls 12 and to the cylindrical trough 18 assist in mounting the latter in position underneath the hopper outlet 10.

The configuration of the valve shaft 15 is of particular importance. As illustrated in FIGS. 3, 4 and 5, the valve shaft 15 has ends 23 which are provided with square sockets 24 for a purpose that presently will be apparent. Cavities 25 and 26 are formed in the surface of the shaft 15, the cavities 25 being located in pairs on opposite sides of the shaft 15 at one end while the cavities 26 are located in pairs on opposite sides of the shaft 15 at the other end. The cavities 25 and 26 are generally spherical in configuration and have arcuate bottoms 27 and 28. As illustrated in FIG. 5 the centers of the cavities 25 are located along a line at an angle, indicated at 29, of the order of 60° away from the horizontal when the shaft 15 occupies the closed position. As illustrated in FIG. 6 the centers of the cavities 25 are located along a line at an angle of the order of 60°, indicated at 30, away from and circumferentially of the centers of the cavities 26. This arrangement makes it possible to pivot the shaft 15 from the position shown in FIG. 5, the valve closed position, to the position shown in FIG. 6, the valve open position, where lading can flow through the cavities downwardly as indicated by arrows 31. When the valve shaft 15 is pivoted from the closed position shown in FIG. 5 to an alternate open position where the cavities 26 are aligned with the sharp longitudinal edges 14, then the lading can flow in a similar manner from the opposite end of the valve shaft 15. This facilitates complete evacuation of lading from the hopper outlet 10.

Attention is directed to the fact that cylindrical sections 32 remain between the several cavities 25 and 26. As a result there are a corresponding number of bearing surfaces between the end walls 11 for the valve shaft 15 to ride on the sharp longitudinal edges 14. This arrangement facilitates maintaining the valve shaft 15 in the central position shown in FIGS. 5 and 6.

Reference now will be made to FIGS. 7, 8, 9 and 10 which show certain details of construction at one end of the hopper outlet 10. It will be understood that the other end of the hopper outlet 10 is provided with a similar construction. It will be noted that the end 23 of the valve shaft 15 is journaled in the end wall 11 and extends through a wiper seal 33 that is mounted on the outer side of the end wall 11. A square wrench portion 34 is employed for entering the square socket 24 to pivot the valve shaft 15 from the closed to either of the open positions. It will be understood that the flow of the lading can be regulated depending upon the extent to which the valve shaft 15 is pivoted from the closed position shown in FIG. 5 to the open position shown in FIG. 6. The square wrench portion 34 is carried by the lower end 35 of a stem 36 which forms a part of a removable T-shaped handle that is indicated, generally, at 37. The handle 37 can be shifted from the full line position shown in FIG. 9, corresponding to the closed position of the valve shaft 15 to the full open position as shown by broken lines. The extent of pivotal movement of the T-shaped handle 37 is limited on engagement by the stem 36 with either of shoulders 38 that are carried by an arcuate plate 39 which is suitably secured, as welding, to a vertical wall 40.

The cylindrical trough 18 opens at each end into a semi-circular discharge tube 41 having telescoped at its outer end therewith a cylindrical outlet tube 43 which is intended to be connected to a pneumatic nozzle for the purpose of applying vacuum thereto for withdrawing the lading from the hopper 10 through the trough 18 and the semi-circular discharge tube 41. A radial flange 44 extends from the outlet tube 43 and is secured by bolts 45 to a radial flange 46 that is secured, as by welding, to the outer side of the semi-circular discharge tube 41.

It is desirable to permit flow of auxiliary air into the outlet tube 43 during the evacuation process of the lading. For this purpose an opening 49 is provided in the plate 40. A filter 50 overlies the opening 49 and it is secured in place by a suitable frame 51 that, in turn, is secured to the plate 40.

When not in use it is desirable that the filter 50 be closed off. For this purpose a cover 52 is employed. It is generally semi-circular in configuration and has laterally extending pintles 53 which are journaled in bearings 54. The arrangement is such that sufficient friction is provided between the pintles 53 and the bearings 54 to hold the cover 52 in any position to which it may be shifted. A tab 55 extends upwardly from the cover 52 and projects through a slot 56 in the arcuate plate 39. The tab 55 is in the path of the handle 37 and is arranged to be engaged thereby when the handle 37 is withdrawn. This insures that the cover 52 will be closed.

Figure 7:
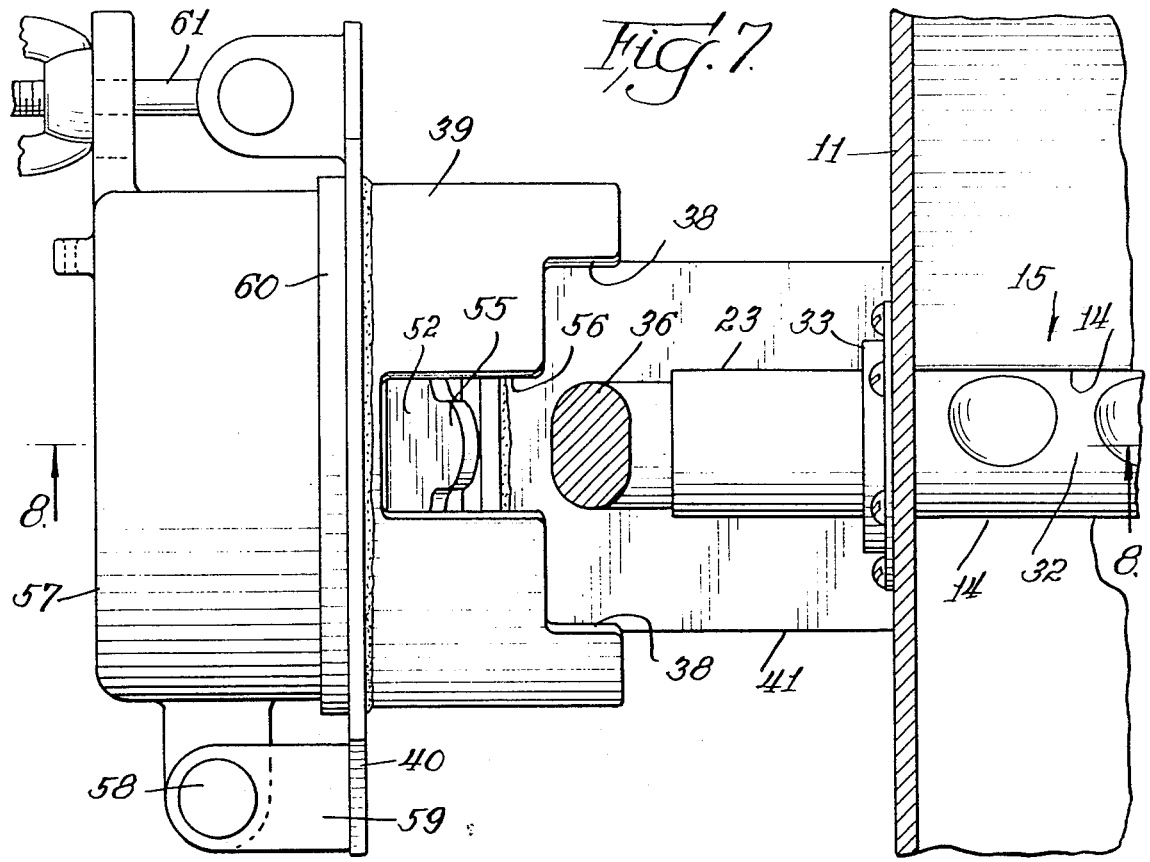
FIG. 7 is a horizontal sectional view taken generally along line 7—7 of FIG. 8.
Figure 8:
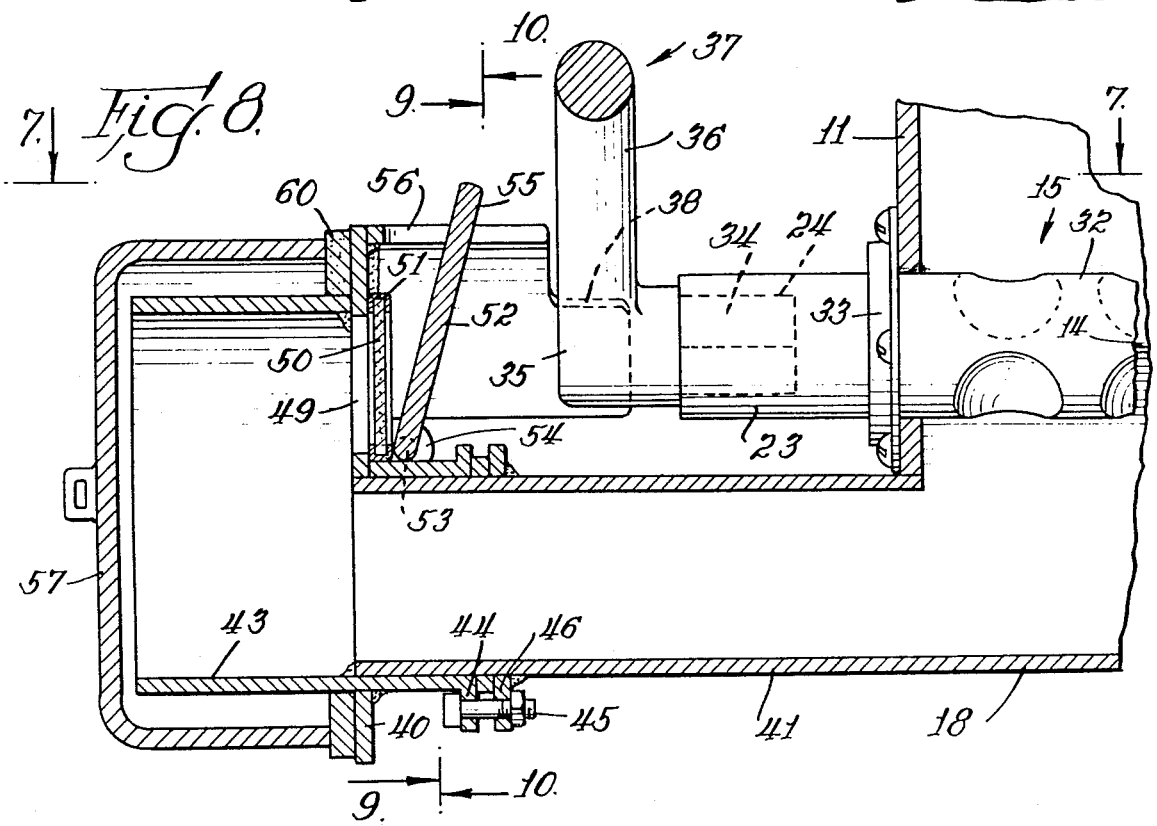
FIG. 8 is a vertical sectional view taken generally along line 8—8 of FIG. 7.
Figure 9:
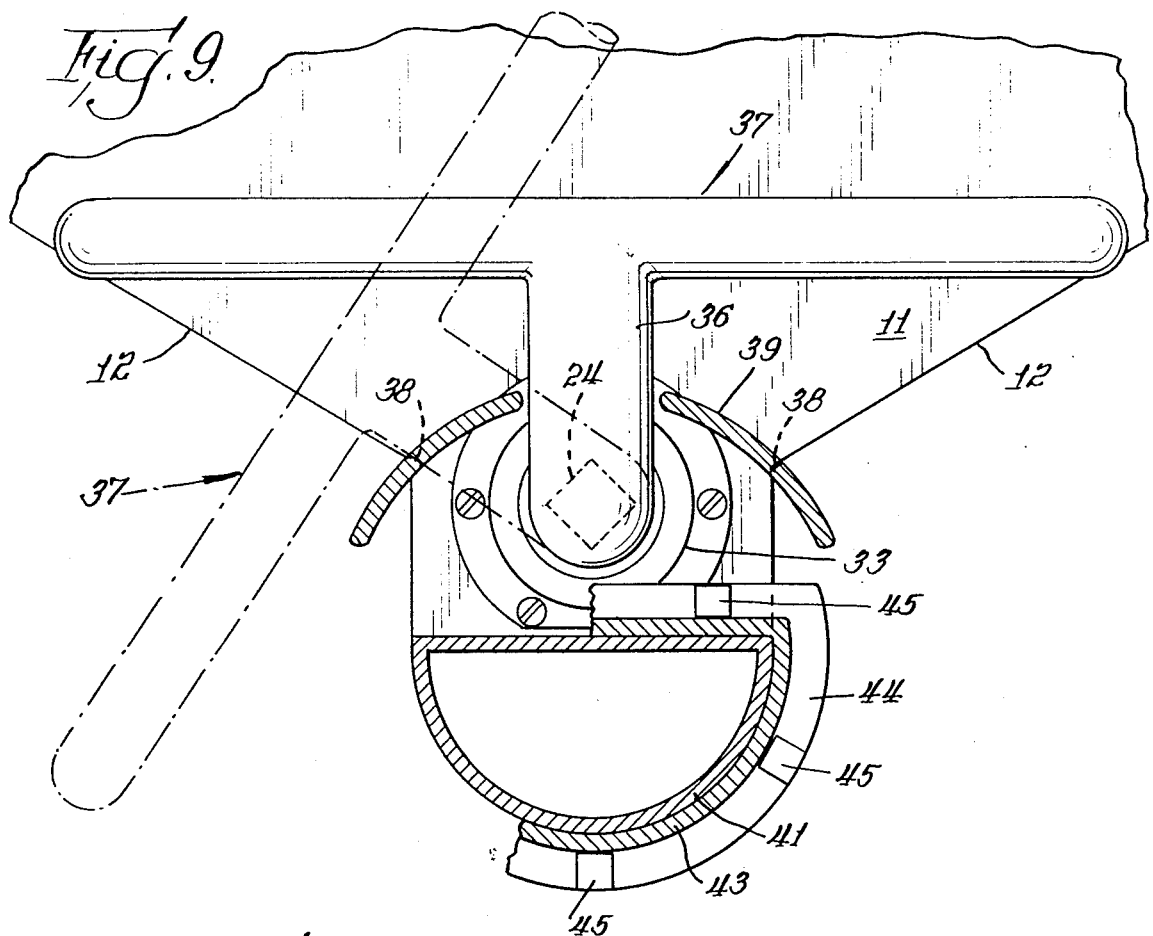
FIG. 9 is a vertical sectional view taken generally along line 9—9 of FIG. 8 and looking in the direction of the arrows.

When lading is to be unloaded, a suitable pneumatic hose is connected to the cylindrical outlet tube 43. It is desirable that this tube normally be closed. For this purpose a cylindrical cap or cover 57 is employed. As shown in FIG. 7 the cover 57 is hinged at 58 to an arm 59 which extends laterally from the front side of the wall 40. A gasket 60 is interposed between the cover 57 and the wall 40 when the former is in the closed position. A retaining bolt 61 serves to hold the cover 57 in the closed position against gasket 60.

Figure 10:
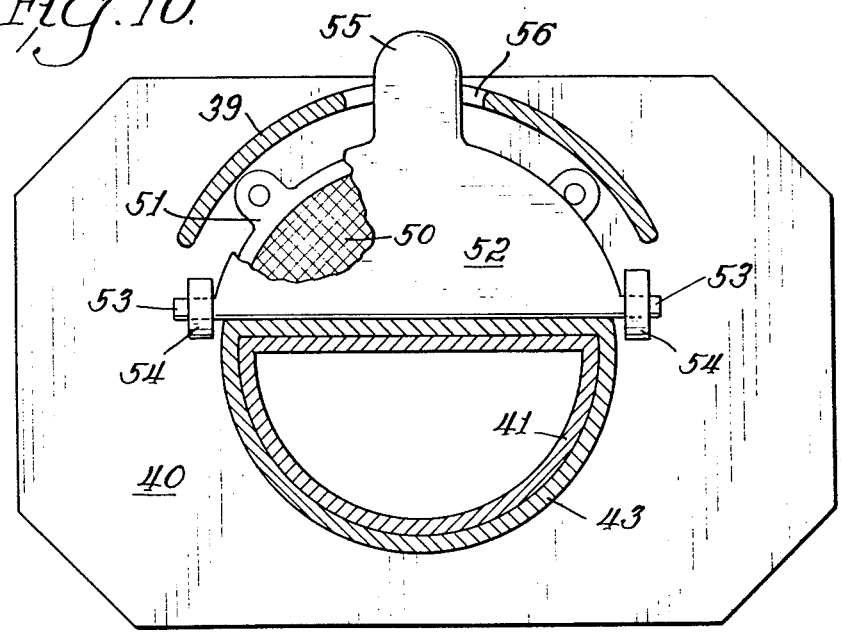
FIG. 10 is a view, similar to FIG. 9, taken generally along line 10—10 of FIG. 8 and looking in the direction of the arrows.

It will be understood that the cover 52 is semicircular in configuration, as illustrated in FIG. 10. Also it will be understood that, on removal of the bolts 45 it is possible to withdraw all of the mechanism that is mounted on the outer end of the semicircular discharge tube 41. This makes it possible to insert or withdraw the valve shaft 15 as may be required.

When the semi-circular discharge tube 41 is employed and is connected, as described, to the cylindrical trough 18, there is a reduction in the cross sectional area of the discharge opening from the trough 18 to the discharge tube 41. This interferes with the rapid discharge of the lading on application of vacuum.

FIG. 11 shows another embodiment of the construction for the trough. As indicated at 62 a trough 18' has a lower semicircular portion which has the same cross sectional area as that of the semi-circular discharge tube 41. At its upper end the trough 18' has a small area portion 63 the ends 64 of which are welded as indicated at 65 to the under sides of the side walls 12. Using the construction shown in FIG. 11 in conjunction with the semi-circular discharge tube 41 there is only a slight reduction in cross sectional area of the trough 18' as it empties into the discharge tube 41.

Still another arrangement is illustrated in FIGS. 12 and 13 to reduce the differential between the cross sectional area of the semi-circular discharge tube 41 and the underlying trough 18. Here it will be observed that a trough, indicated generally at 18'', is of oval shape of such dimensions that it extends well below the valve shaft 15. The ends 66 of the trough 18'' may be welded, as indicated at 67, to the undersides of the inclined side walls 12. At each end the lower portion of the oval shaped trough 18'' merges with a cylindrical outlet tube 68. The cross sectional area of the oval trough 18'' is about the same as that of the discharge tube 68. Thus there is essentially no reduction in cross sectional area that is encountered by the lading as it goes from the hopper outlet 10 to the discharge tube 68.

Referring now to FIGS. 14 and 15 it will be observed that cavities 25 and 26 are not located diametrically opposite each other. Rather one cavity 25 of each pair is located diametrically opposite the cavity 26 of the other pair with these cavities 25 and 26 being spaced endwise along the valve shaft 15. In the open position of the valve shaft 15, as shown in FIG. 15, lading can flow simultaneously through one of the cavities 25 and one of the cavities 26 along opposite sides of the valve shaft 15 and at opposite ends thereof. By varying the position of the valve shaft 15 between that shown in FIG. 14 and that shown in FIG. 15, it is possible to vary the rate of which the lading is discharged. By pivoting the valve shaft 15 through a suitable angle the discharge of lading can be effected from opposite sides of the valve shaft 15 by positioning the cavity 25 adjacent the sharp edge 14 at the right side while at the same time positioning the cavity 26 adjacent the sharp edge 14 at the left side. This facilitates complete evacuation of the hopper outlet 10.

Figure 16:
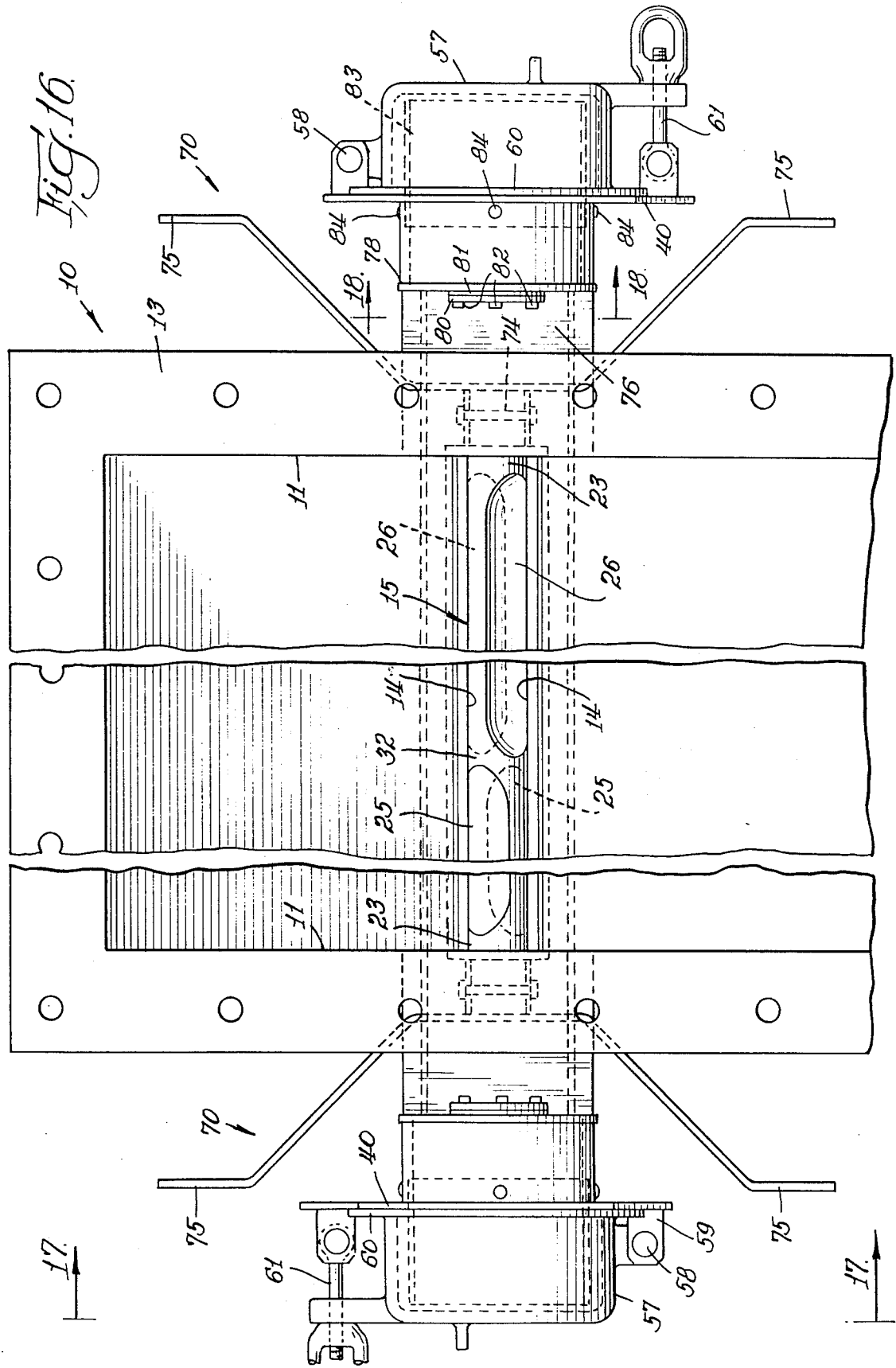
FIG. 16 is a top plan view showing a modified form of hopper outlet construction and provided with a valve shaft having only two pairs of diametrically positioned cavities through which the lading can flow.

The hopper outlet 10 illustrated in FIGS. 16–19 is similar in construction to that shown in FIGS. 1–10. Instead of employing a plurality of pairs of cavities 25 and 26 as illustrated in FIG. 3, only two pairs of cavities 25 and 26 are employed. They are located at opposite ends of the valve shaft 15. However, the cross sectional views illustrated in FIGS. 5 and 6 are applicable. In FIG. 16 the pairs of cavities 25 and 26 are elongated cavities having arcuate bottoms and also arcuate ends.

Provision is made for pivoting the valve shaft 15 by generally V-shaped handles that are indicated, generally at 70. The handles 70 are of duplicate construction. Each includes a flat bottom 71 having a depending portion that is welded at 72 to a retaining collar 73 which overlies each projecting end 23 of the valve shaft 15. A transverse bolt 74 extends through each retaining collar 73 and the end 23 of the valve shaft 15 to secure the respective handle 70 to the valve shaft 15. Ends 75 of the handle 70 can be grasped manually for pivoting the valve shaft 15 from the central valve closed position to the valve open position on either side of the valve closed position or to any position in between. The arrangement is such that the valve shaft 15 will remain in any position to which it is pivoted by one or the other handle 70.

A closure plate 76 overlies the semi-circular discharge tube 41. Extending upwardly from the closure plate 76 is a semicircular plate 78 that is provided with an opening 79 which is aligned with the valve shaft 15. The purpose of this construction is to facilitate the application and removal of the valve shaft 15 to the hopper outlet 10. The opening 79 is closed off by a removable cover plate 80 with a gasket 81 between it and the plate 78. Retaining bolts 82 extend through the cover plate 80 into the plate 78 for holding the former in place.

The cylindrical outlet tube 43 is telescoped with a short cylindrical extension 83 to which a suitable pneumatic hose can be connected as will be understood readily. Rivets 84 secure the cylindrical extension 83 to the outlet tube 43.

I claim:

1. A pneumatic hopper discharge outlet comprising: end walls and inclined side walls having sharp longitudinal edges in parallel spaced relation, a cylindrical valve shaft pivoted at its ends on said end walls about an axis along a line between said sharp longitudinal edges midway thereof and having a diameter such as to provide clearance between it and said sharp longitudinal edges, said valve shaft having cavities for alignment with said sharp longitudinal edges in one position for flow of lading downwardly, said valve shaft in another position closing off the space between said longitudinal sharp edges, a trough underlying said valve shaft for receiving said lading for pneumatic removal, said trough terminating in a semi-cylindrical discharge tube joined to a cylindrical outlet tube, and a wall extending upwardly from said semicylindrical discharge tube, overlying said cylindrical outlet tube with an opening for auxiliary air flow.

2. The pneumatic hopper discharge outlet according to claim 1 wherein a filter overlies said opening, a removable handle is engageable with the end of said valve shaft for pivot-ing it between open and closed positions, and a pivotable cover is arranged to overlie said filter and to be moved to closed position by said handle on removal thereof from said valve shaft.

3. The pneumatic hopper discharge outlet according to claim 1 wherein said handle is T-shaped and has an outstanding wrench portion at the lower end of the stem for engaging said end of said valve shaft, and stop means extending from said wall on said discharge tube cooperate with said stem to limit pivotal movement of said valve shaft in opposite directions.

4. A pneumatic hopper discharge outlet comprising: end walls and inclined side walls having sharp longitudinal edges in parallel spaced relation, a cylindrical valve shaft pivoted at its ends on said end walls about an axis along a line between said sharp longitudinal edges midway thereof and having a diameter such as to provide clearance between it and said sharp longitudinal edges, said valve shaft having cavities for alignment with said sharp longitudinal edges in one position for flow of lading downwardly, said valve shaft in another position closing off the space between said longitudinal sharp edges, a trough underlying said valve shaft for receiving said lading for pneumatic removal, said trough terminating in a semi-cylindrical discharge tube joined to a cylindrical outlet tube, a wall extending upwardly from said semi-cylindrical discharge tube, overlying said cylindrical outlet tube with an opening in alignment with said shaft to permit insertion and removal thereof, and a removable cover plate for closing off said opening.

* * * * *